United States Patent [19]

Wade

[11] Patent Number: 5,338,258

[45] Date of Patent: Aug. 16, 1994

[54] DRIVE TRANSMISSION COUPLINGS

[75] Inventor: Malcolm V. Wade, Meadowbank, Australia

[73] Assignee: IVG Australia Pty. Ltd., Lidcombe, Australia

[21] Appl. No.: 771,421

[22] Filed: Oct. 4, 1991

[30] Foreign Application Priority Data

Oct. 11, 1990 [AU] Australia .................. PK2745

[51] Int. Cl.$^5$ .................................... F16D 3/10
[52] U.S. Cl. .................................. 464/6; 475/91
[58] Field of Search ............. 464/3, 6, 24, 57, 86, 464/160; 475/91, 114, 115

[56] References Cited

U.S. PATENT DOCUMENTS

| | | | |
|---|---|---|---|
| 2,727,608 | 12/1955 | Smith | 464/24 X |
| 2,743,628 | 5/1956 | Scharaffa | 464/24 X |
| 4,176,522 | 12/1979 | Holtzapple et al. | 464/86 X |
| 4,535,737 | 8/1985 | Takami | 464/6 X |

Primary Examiner—Daniel P. Stodola
Attorney, Agent, or Firm—Smith-Hill and Bedell

[57] ABSTRACT

A start-up coupling engages progressively in two stages. During the first stage drive is transmitted from an input shaft (3) along respective paths (8,7,9,12,11,10,25 and 26; and, 19,20,19 and 32) to helically-toothed rollers (27,30) which mesh but are designed to be incapable of transmitting drive between them, or of doing so very inefficiently. The rollers (27,30) are mounted in an oil-filled chamber (18) in a casing (1) integral with an output shaft (2). During the first hydraulic stage of engagement, oil pockets between their oppositely-moving teeth (28,31) prevent them from engaging as the phase of one roller (27) is progressively changed by a centrifugal adjustment (4) against the bias of a torque cell (19). However, increasing frictional resistance in the oil pockets causes the rollers (27,30) to exert an increasing rotational torque on the casing (1). Simultaneously, the relative movement of the roller teeth diminishes to reduce the hydraulic pressure in the pockets to a level where the pockets collapse. This initiates the second stage of engagement when drive is transmitted through the coupling mechanically by way of rubbing of the roller teeth (28,31). This rubbing ceases when engagement of the coupling is completed. Tooth wear is lessened by the two stages of engagement.

8 Claims, 6 Drawing Sheets

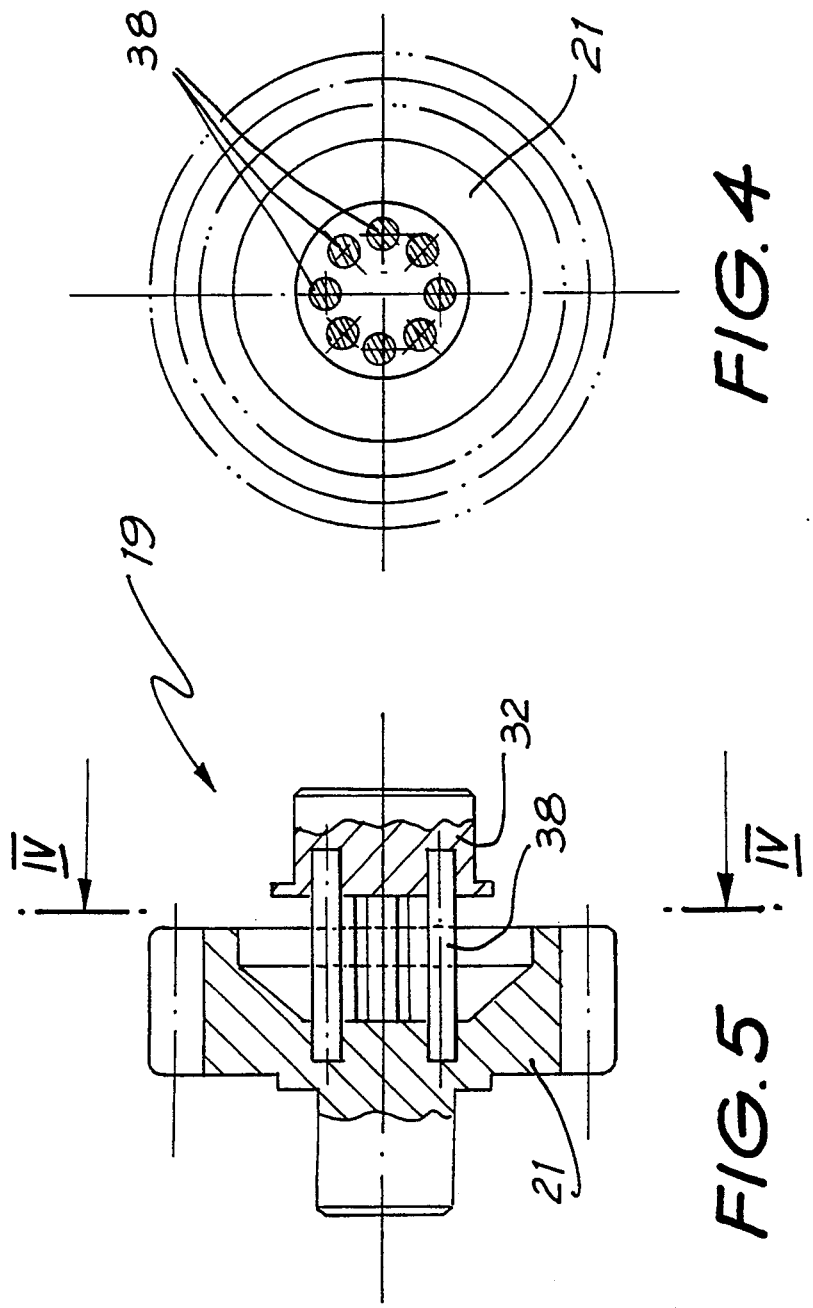

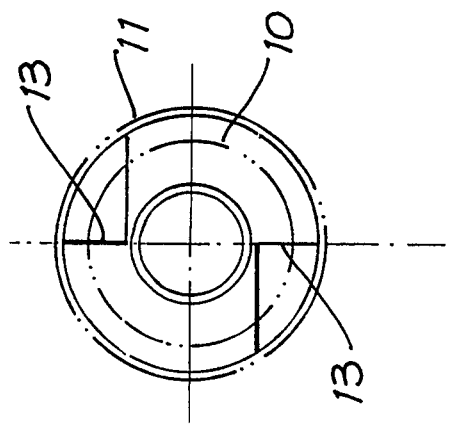
FIG. 8
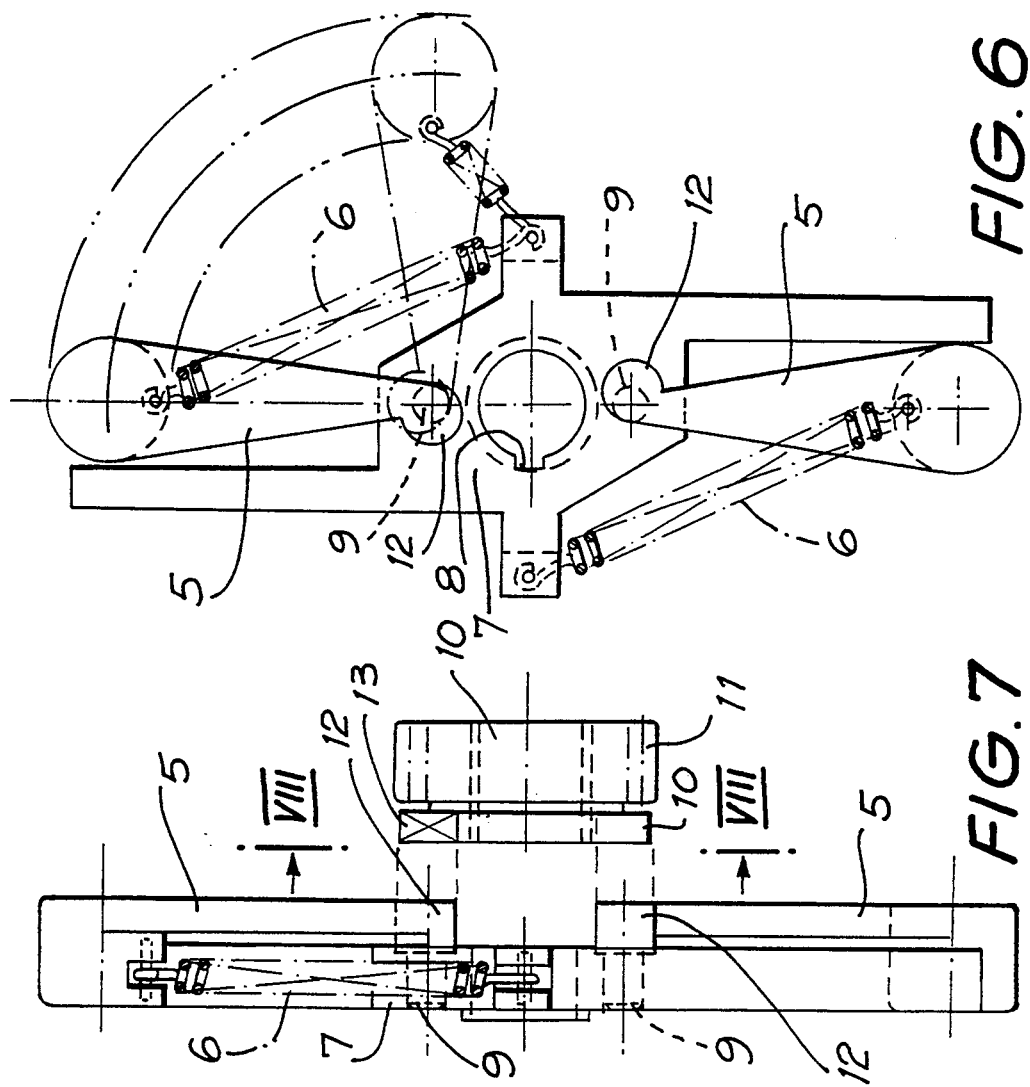
FIG. 6
FIG. 7

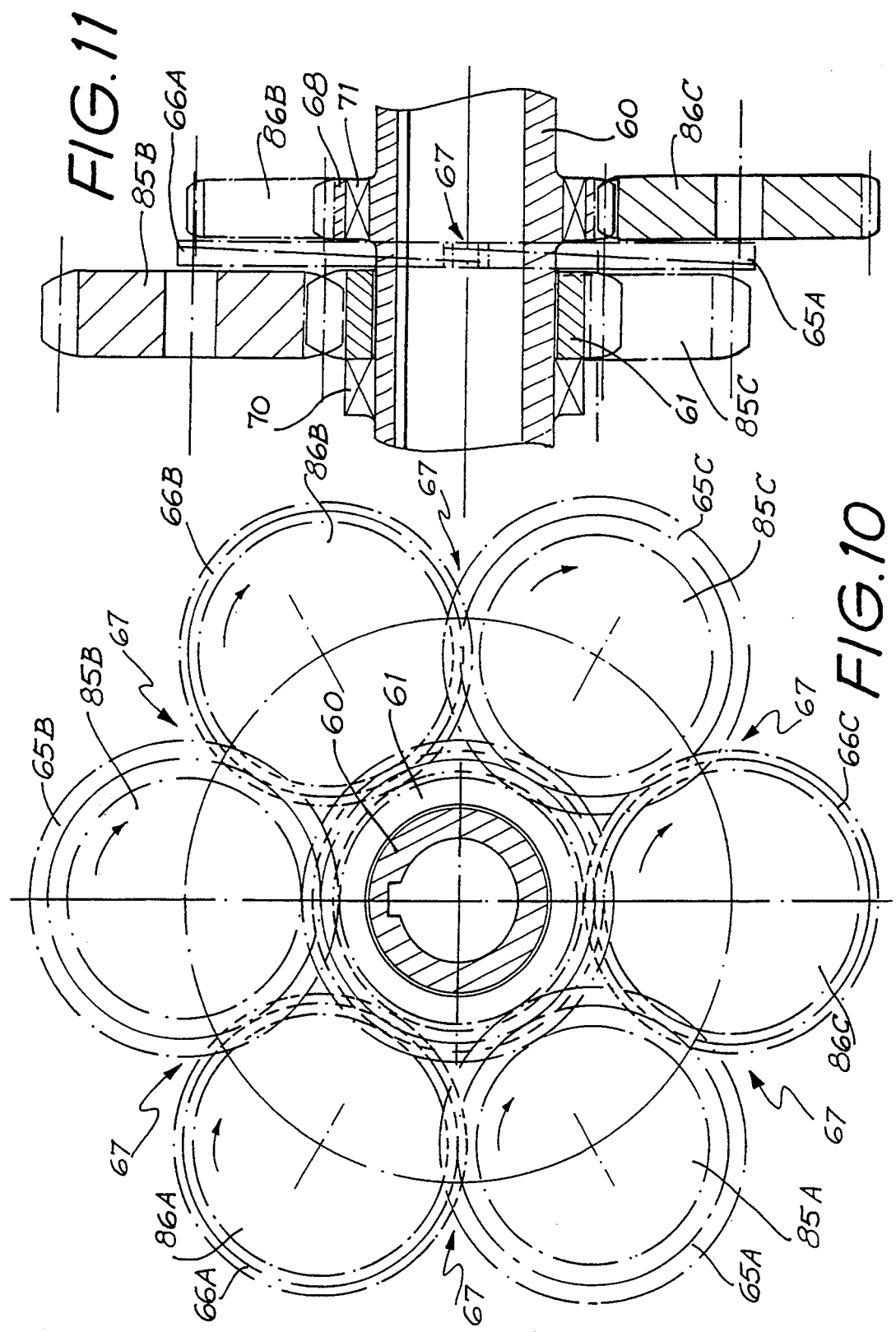

DRIVE TRANSMISSION COUPLINGS

FIELD OF THE INVENTION

This invention relates to a coupling and is more specifically concerned with a coupling having the characteristic that during an initial part of its engagement phase of operation, torque is transmitted through a liquid rather than through mechanical parts rubbing on one another, and, during a final phase of its engagement sequence torque is transmitted through contacting surfaces of its mechanical parts. Such a coupling will be referred to hereinafter as being "of the type described".

STATE OF THE ART

In our co-pending and published patent application No. PCT/AU89/00418, a coupling is shown in FIG. 14 which has aligned input and output shafts, and a casing connected to the output shaft and containing two rollers having helical meshing teeth shaped and positioned so as to be incapable of transmitting drive between them, or of doing so in a very inefficient manner, the teeth being able to translate over one another if the rollers are rotated in the same direction and in synchronism. The torque transmitted through the coupling is a function of the extent to which the teeth of the rollers bear with their flank surfaces on one another. This, in turn, is alterable by changing the relative phase of rotation of the rollers. A manually operable phase-changing mechanism is used to vary the relative phases of the teeth of the rollers between extreme positions at one of which they lock against one another and at the other of which they translate freely over one another. At intermediate positions, rubbing occurs between the flank surfaces of the roller teeth, and the extent of this rubbing determines the frictional heat generated during the operating phase when the coupling is engaging to connect the load to the input drive shaft.

It is a feature of the gear mechanism shown in the above-mentioned PCT patent application, that the flank surfaces of the teeth engage one another physically throughout the engagement sequence of the coupling. Ways of extending the normal point contact between the teeth, into a line contact to diminish the wear on the flank surfaces of the teeth are described, to improve the life of the coupling.

OBJECT OF THE INVENTION

An object of this invention is the provision of an improved coupling.

SUMMARY OF THE INVENTION

In accordance with one aspect of the invention a coupling has a chamber filled with hydraulic liquid and containing two axially-parallel rollers having helically-extending teeth of the same spiral hand which overlap one another in a common meshing zone and are shaped and positioned to be incapable of transmitting drive between the rollers, or of doing so with a very poor efficiency, when flank surfaces of the teeth contact one another; a first drive member connected to revolve both rollers in the same direction of rotation at a predetermined speed ratio so that their teeth translate freely over one another; adjustable means for effecting engagement of the coupling and which, during a first phase of the engagement sequence, resiliently biases opposed but non-contiguous flank surfaces of the teeth towards one another and against opposite sides of a pocket of hydraulic liquid maintained between the flank surfaces of the teeth by their relative motion into the pocket so that the liquid prevents the teeth from physically bearing on one another during the initial phase; the final phase of the engagement sequence of the coupling occurring when the bias of the adjustment means overcomes the pressure of the liquid in the pocket which diminishes as the gathering speed of the coupling reduces the relative speed of the teeth flank surfaces until it falls to a value insufficient to maintain the liquid pressure in the pocket whereupon the teeth of the rollers bear physically on one another to complete the engagement phase of the coupling.

In accordance with a second aspect of the invention, a coupling has an input drive shaft and an output drive shaft, a casing providing an internal oil-filled chamber, axially parallel rollers located in said chamber, helical teeth provided on the outside surfaces of said rollers and meshing with one another along a meshing zone located between said rollers said teeth being shaped and positioned to be incapable of transmitting drive between the rollers or of doing so in a very inefficient manner, drive transmission means rotating said rollers in the same direction from the input drive shaft so that their teeth translate over one another in the meshing zone while travelling in opposite directions across said meshing zone, said teeth having their flank surfaces forcing hydraulic liquid under pressure into hydraulic cushions or pockets respectively located between the teeth in the meshing zone, adjustable means operable to vary the phase of rotation of one of the rollers with respect to a second roller to urge their teeth towards one another, resiliently yieldable means which provide a bias against which the second roller is permitted limited phase displacement under the axial pressure of the teeth of the first roller transmitted through the hydraulic pockets, bearing means converting resistance to rotation of the second roller into an orbital movement which is applied as a torque to rotate the casing and thus the output drive shaft, progressive increase in rotational speed of said casing reducing the relative rotation of said rollers and thus the hydraulic pressure in the pockets until said resiliently yielding means overcomes the hydraulic pocket pressure to bring the teeth flank surfaces into contact and complete the engagement of the coupling.

PREFERRED FEATURES OF THE INVENTION

Preferably the adjustable means includes first means responsive to the speed of one of the rollers during the engagement phase of the clutch's operation to urge the flank surfaces on one side of its tooth or teeth towards the opposed flank surfaces of the tooth or teeth of the other roller.

The resiliently yielding means may take the form of a torque cell be positioned to yield resiliently with increasing drive torque applied by the first drive member to the second roller during the engagement phase. This alters the phase angle between said second roller and said first drive member in a direction which maintains the pocket of hydraulic liquid between opposed flank surfaces of the roller teeth. In practice, the pocket of hydraulic liquid has a thin wedge-shaped profile. A mechanical connection is suitably arranged to transmit orbital movement of said second roller about an output shaft to a driven output member.

The advantage of the coupling of the invention is that it engages without physical contact between the teeth occurring until close to the end of the engagement sequence. When such physical contact occurs, the relative velocities of the flank surfaces of the teeth which come into ultimate engagement, are travelling in opposite directions at a much smaller relative speed than occurs during the initial part of the engagement sequence. Wear on the teeth caused by engagement of the coupling is therefore greatly diminished as compared with the wear which occurs on a coupling having teeth which physically contact one another throughout the engagement sequence.

The preferred arrangement of the coupling is to have a rotatable, oil-filled housing arranged between coaxial input and output shafts providing said members, the housing being fixed to the output shaft. The second roller is preferably arranged eccentrically with respect to the common axis of the input and output shafts so that the casing provides the connection which converts the orbital movement of the second roller into rotation of the output shaft.

The thicknesses of the hydraulic liquid pockets is small so there is a relatively high frictional drag exerted between the opposed flank surfaces of the teeth defining opposite faces of the pockets, as the teeth travel past one another. This drag resists rotation of the second roller so that the input torque is partially converted into orbital movement of the roller and thus the housing.

Suitably both rollers are eccentrically mounted with respect to the axis of rotation of the output member so that both rollers experience frictional drag as a result of the hydraulic liquid trapped in the pockets. As the rollers are turning in the same direction and preferably are journalled into eccentrically-arranged positions with respect to the axis of rotation of the housing, the frictional drag on the rotation of both rollers causes each of them to exert a torque in the same direction on the housing. This torque is applied to a load attached to the output shaft.

INTRODUCTION TO THE DRAWINGS

The invention will now be described in more detail, by way of example, with reference to the accompanying largely diagrammatic and schematic drawings, in which:

IN THE DRAWINGS

FIG. 4 is a diagrammatic section through a torque cell in FIG. 2 and as seen on the line and in the direction indicated by the arrows IV—IV in FIG. 2;

FIG. 5 shows the torque cell of FIG. 4 in an enlarged part-sectional side view;

FIG. 6 is a vertical section through part of FIG. 2 as seen along the line and in the direction of the arrows VI—VI in FIG. 2 the parts of FIG. 6 being shown in two operative positions;

FIG. 7 is an exploded side view of FIG. 6;

FIG. 8 is a face view of part of FIG. 7 as seen on the line and in the direction indicated by the arrows VIII—VIII in FIG. 7;

FIG. 10 shows a different configuration of rollers to that illustrated in FIG. 2, and comprises a second variation of the preferred embodiment; and, FIG. 11 is a vertical section through part of a hollow shaft used in the second variation of FIG. 10.

DESCRIPTION OF PREFERRED EMBODIMENT

Figure 1:
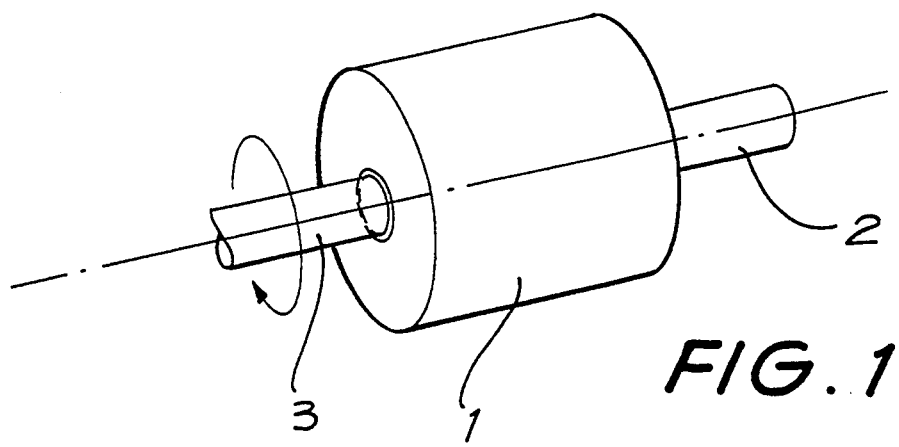
FIG. 1 is a diagrammatic perspective view of a drive transmission coupling interconnecting two shafts.
Figure 2:
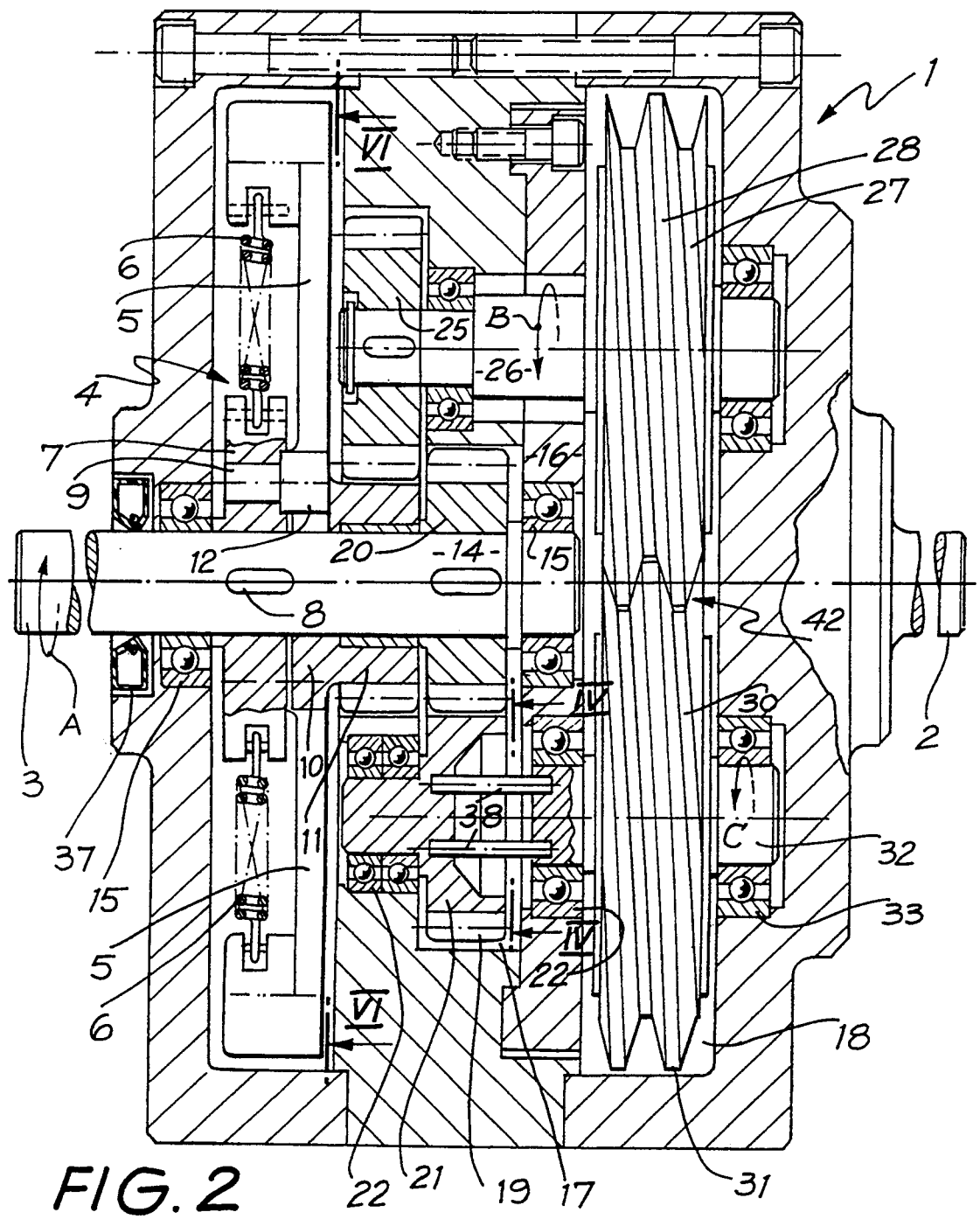
FIG. 2 is a diagrammatic vertical section through the coupling of FIG. 1.

FIG. 1 shows a rotary casing 1 connected to an output shaft 2 which is co-axial with an input drive shaft 3 extending into the opposite side of the casing. As shown in FIG. 2, the shaft 3 supports inside the casing a centrifugally biassing means shown generally at 4. The biassing means 4 is shown in more detail in FIGS. 6,7 and 8 and comprises a balanced arrangement of weighted arms 5 which are held by tension springs 6 at positions at which they extend generally tangentially to a hub 7 keyed at 8 to the shaft 3, as shown by the broken outline position of one of the arms 5. The hub 7 is provided with a pair of diametrically opposed parallel holes containing pivot pins 9 by way of which the arms are pivotted to the hub 7.

A collar 10 is rotatable on the shaft 3 and is united with an axially-spaced spur gear 11. The arms 5 each carry a cam 12 at its inner end the cam 12 being eccentric with respect to the axis of the pivot pin 9. The cams 12 are received in respective slots provided with abutment faces 13 in the collar 10 which are engaged by the cams 12. The cams 12 convert rotary movement of the arms 5 about their pivot pins 9 into a change in the angular position of the collar 10 with respect to the hub 7. Thus the centrifugal outward movement of the arms 5 against the bias of the springs 6 causes a small change in the phase angle of the gear 11 with respect to the shaft 3.

The shaft 3 has an end-portion 14 mounted inside the casing 1 as shown in FIG. 2, and supported in spaced bearings 15. The innermost bearing 15 is mounted in a web 16 forming part of the casing 1 and extending inwardly thereof, the web 16 dividing the interior of the casing into two chambers 17 and 18 both of which are oil-filled.

A second spur wheel 20 inside the chamber 17 is keyed to the shaft 3 and meshes with an idler pinion 21 forming part of a torsion cell 19 which is supported by a pair of spaced bearings 22 in the web 16 and in the casing 1. The torsion cell 19 provides a resiliently yielding biassing means.

Figure 3:
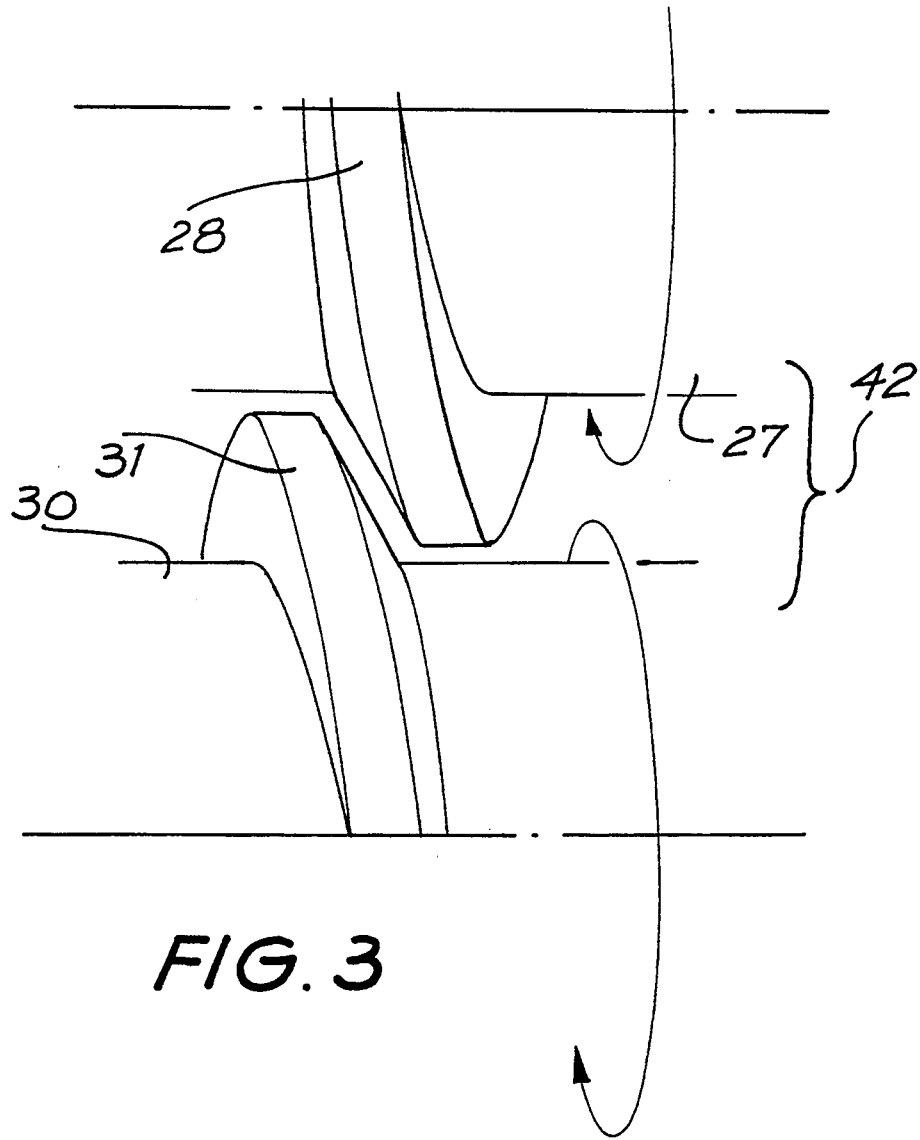
FIG. 3 is a diagrammatic representation of portions of two helical teeth passing through a common meshing zone as seen at right angles to the plane containing the axes of two rollers respectively formed with the teeth.

The spur gear 11 meshes with a pinion 25 keyed to a shaft 26 extending parallel to the common axis of the shafts 2 and 3. The shaft 26 carries inside the chamber 18 a roller 27 having a helically extending tooth 28, having the profile shown in FIG. 3. A second roller 30 has a helical tooth 31 which engages in a meshing zone 42 with the helical tooth 28 as shown in FIG. 2. The roller 30 is mounted on a shaft 32 on the opposite side of the common axis of the shafts 2,3 to the roller 27, by a bearing 33 and one of the bearings 22 of the torsion cell 19.

The torsion cell 19 is shown in detail in FIGS. 4 and 5 and comprises the idler pinion 21 and a ring of parallel and stiffly resilient flexible steel pins 38 which flex slightly to allow some stiff torsional movement to occur between the pinion 21 and the shaft 32. The pins 38 have their opposite end-portions attached in respective bores in the idler pinion 21 and in the opposed end of the shaft 32. The intermediate portions of the pins 38 are unsupported so that they allow some angular twist to occur between the shaft 32 and the idler pinion 21, against the inherent resilience of the pins 38.

A gland 37, shown in FIG. 2 and through which the shaft 3 passes, provides a seal between the shaft 3 and the casing 1, so that oil which fills the interior of the casing 1 cannot escape.

OPERATION OF THE PREFERRED EMBODIMENT

The coupling operates as follows.

It is assumed that the load is connected to the output shaft 2 and that a start-up drive is applied to the input drive shaft 3 and is to be progressively applied to the load. As the drive 3 commences to rotate in the direction shown by the arrow 'A', its rotation is transmitted through the key 8, the hub 7, the pins 9, and the abutting surfaces of the cams 12 with the abutment faces 13 of the collar 10, to the spur gear 11. This turns the pinion 25 to urge the roller 27 to rotate in the direction of the arrow 'B'. The teeth 28 and 131 are so shaped and positioned on the rollers 27 and 30 that they are incapable of transmitting rotational drive between them, or of doing so very inefficiently. The only situation in which the roller 27 can rotate freely, is when the roller 30 is simultaneously rotated at the same speed and in the same direction.

The drive from the shaft 3 is also transmitted to the spur gear 20 and thus to the idler pinion 21 of the torsion cell 19. This drive is transmitted via the torsion pins 38 which flex slightly, while transmitting drive to the shaft 32 supporting the roller 30. This drive acts in the direction of the arrow 'C', namely, in the same direction as the shaft 26. As now both rollers 27 and 30 are driven at the same speed and in the same direction from the same drive, they can turn freely as their teeth propagate together in the same direction along the meshing zone 42 without drive being transmitted between them. No drive is transmitted to the casing 1 and thus to the output shaft 2, in this condition.

As the shaft 3 gathers speed, the two weighted arms 5 move outwards so that the eccentricity of the cams 12 with respect to the pins 9 causes the angular position of the spur gear 11 to advance with respect to that of the shaft 3. This phase advance is transmitted via the pinion 25 to the roller 27. The arms 5 thus provide adjustable means for engaging the coupling.

As the shafts 32 and 26 are rotating in the same direction, the flank surfaces of the teeth 31 and 28 are travelling in opposite directions to one another across the meshing zone 42, so that a thin, wedge-shaped pocket or cushion of oil under pressure is formed between the flank surfaces of the teeth. This thin oil pocket not only prevents the teeth flank surfaces from actually touching one another, but it also exerts a frictional drag between the teeth which is a function of the viscosity of the oil, the width and geometry of the pocket, and the relative speeds of rotation of the teeth 28 and 31 into the pocket, as it is the relative speeds of the flank surfaces of the teeth into the pockets which controls the oil pressure within them.

The oil drag in the pockets introduces a resistance to the rotation of the roller 30. The torque of the shaft 3 transmitted by way of the spur gear 20 and the pinion 21 is now partially transmitted as an orbital torque on the coaxial bearings 22 and 33 to cause the casing 1 and thus the output shaft 2 to commence to rotate. The flexing of the torsion pins 38 provides a resilient bias which yields to prevent premature collapse of the oil pressure in the pockets between the teeth 28 and 31.

As the input drive shaft 3 gathers speed further, the weighted arms produce an increasing change in the phase of the rollers 27 and 30, so that the widths of the pockets between the flank surfaces of the teeth 28 and 31 diminishes. This increases the frictional drag within the pockets, and thus the resistance to the rotation of the roller 30. Thus progressively more of the torque of the input drive shaft 3 is applied by way of the bearings 22 and 33 of the shaft 32, to the casing 1 and thus to the load.

As the casing 1 picks up speed, the absolute velocities of rotation of the teeth 31 and 28 passing one another in the meshing zone 42 diminishes, so that the oil pressure in the pockets between the teeth also diminishes. The energy stored in the flexed torsion pins 38 now acts on the roller 30 to move the flank surfaces of the teeth 31 and 28 flanking the pockets, closer to one another. This increases the frictional resistance in the pockets, and thus reduces the relative velocities of the teeth with an accumulative effect, until a stage is reached where the flank surfaces of the teeth become contiguous. The frictional rubbing of the teeth flank surfaces on one another completes the final stage of engagement of the coupling by preventing further relative rotation of the rollers 27 and 30. All of the torque of the input drive shaft 3 is now transmitted through the coupling to the output shaft 2. The two rollers 27 and 30 are now firmly engaged with one another by way of the contiguous flank surfaces of their teeth, and relative rotation between them ceases as their helical teeth are arranged and positioned to be virtually incapable of transmitting drive between the roller 27 and 30.

The advantage of the fluid coupling described with reference to the drawings, is that it engages without metallic parts coming into contact with one another until the coupling is almost fully engaged. The wear on the flank surfaces of the teeth is thus minimised.

FIRST VARIATION OF PREFERRED EMBODIMENT

Figure 9:
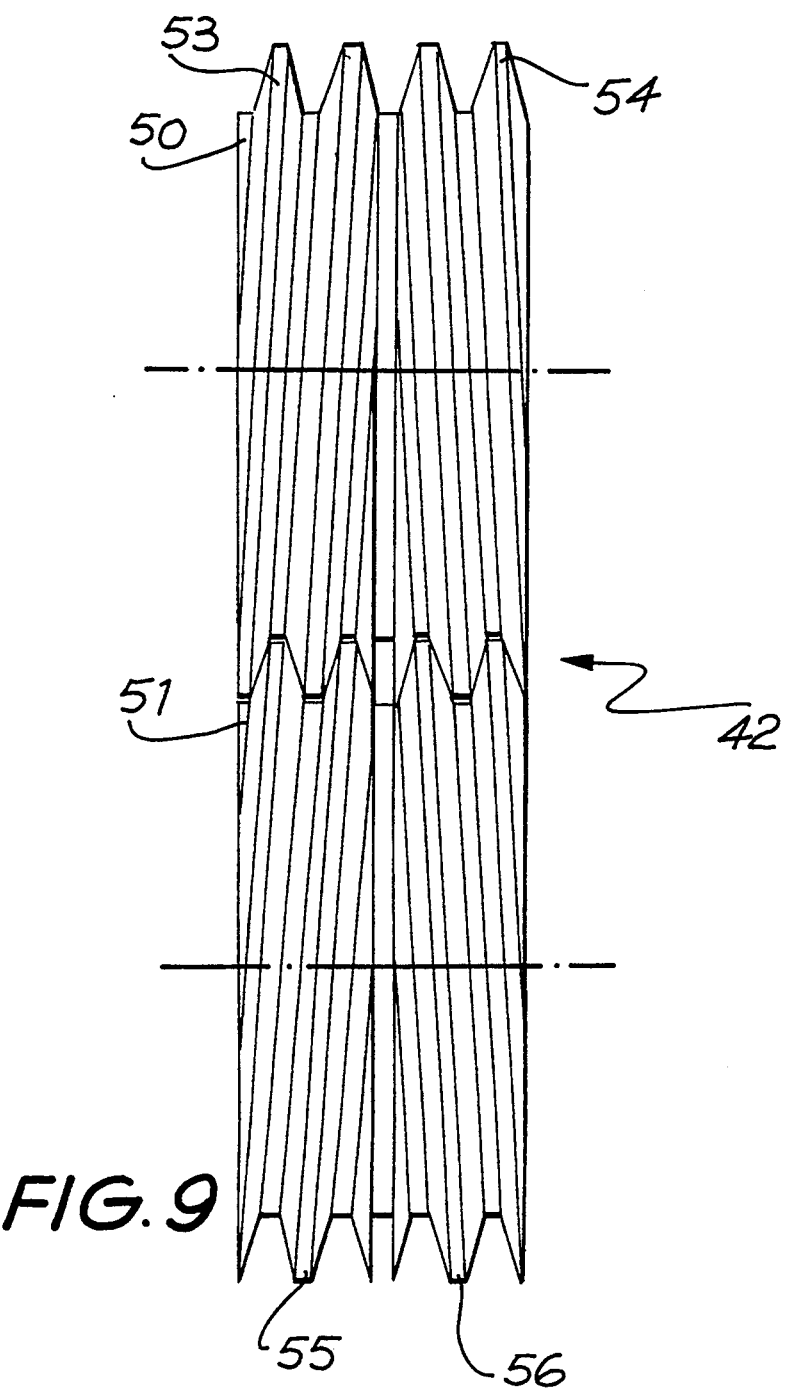
FIG. 9 shows a first variation in the design of two rollers used in the preferred embodiment of FIG. 2.

FIG. 9 shows a pair of toothed rollers 50 and 51 which can be used in place of the rollers 27 and 30 in FIG. 2. Each of the rollers 50, 51 is provided with two axially-spaced regions in each of which the helical tooth has the opposite hand. Thus the roller 50 has oppositely-handed teeth 53 and 54, and the roller 51 has oppositely-handed teeth 55 and 56. The advantage of using oppositely-handed teeth on each roller is that the axial thrust produced on the rollers during engagement of the coupling is greatly reduced or eliminated as the thrust produced by one set of teeth in the meshing zone 42, is opposed and therefore neutralised by the axial thrust acting in the opposite direction and produced by the other set of teeth.

SECOND VARIATION OF PREFERRED EMBODIMENT

Although the rollers in the above embodiments have been shown as having single-start threads, it is preferable for them to have multi-start threads so that the load forces between their teeth during operation of the coupling are spread over a greater number of teeth.

THIRD VARIATION OF PREFERRED EMBODIMENT

In many applications it is preferred to have a hollow shaft extending through the casing. This is not possible in the arrangement of the preferred embodiment as the meshing zone 42 lies on the axis of the shaft 3 as illustrated in FIG. 2. This problem is avoided if the configuration of rollers shown in FIGS. 10 and 11 is adopted. Referring to these figures, a hollow input shaft 60 transmits rotational drive to a spur wheel 61 via a torsion cell 70 which is similar in construction and function to the torsion cell 19 shown in FIG. 2 and which is therefore shown in block schematic form only. The torsion cell 70 provides a stiffly resilient but yielding bias means between the shaft 60 and the spur wheel 61. The spur wheel 61 meshes with each of three spur gears 85A–85C forming a first set and lying in a common plane. Each of the spur gears respectively forms part of three angularly-spaced rollers 65A–65C each formed on its cylindrical surface with a helical tooth. The helically-toothed rollers 65 each correspond to the helically-toothed roller 30 of FIG. 2.

The shaft 60 is also connected via a surrounding phase adjustment means 71 to a second spur wheel 68. The adjustment means 71 may be manually controllable or may operate automatically in much the same way as the phase adjustment means 4 of FIG. 2. The adjustment means 71 is depicted in block schematic form between the spur wheel 68 and the shaft 60. The spur wheel 68 has the same diameter and number of teeth as the spur wheel 61, and drives a second set of three spur gears 86A–86C which are equangularly spaced from one another around the axis of the shaft 60 and have their axes located between the axes of respective spur gears associated with the spur wheel 61. Each of the second set of spur gears 86A–86C is united with a coaxially arranged helically-toothed roller 66A–66C which lies in the same plane as the rollers 65A–65C and meshes with them at its opposite sides as shown in FIG. 10, the zones of meshing being indicated at 67. As is clearly shown by the arrows in FIG. 10, the direction of rotation of the rollers 65 and 66 is the same, i.e. they all rotate in the same direction.

During start-up, the input drive of the shaft 60 is applied to turn the rollers 65 via the torsion cell 70. At the same time the shaft rotation is applied to the rollers 66 via the adjustment means 71. Both sets of rollers 65 and 66 now turn freely as both are driven at the same speed and in the same direction.

To engage the coupling, the phase of the rollers 66 is changed, either manually or automatically by the adjustment means 71, so that their teeth approach the teeth of the set of rollers 65. This causes the pockets or cushions of hydraulic oil trapped between the flank surfaces of the teeth of the rollers in the meshing zones to be compressed as the torsion cell 70 yields resiliently. Friction of the oil in the pockets or cushions causes a drag to be induced on the rotation of the rollers 65 and 66 with the result that they commence to orbit around the axis of the hollow shaft 60. This rotation is imparted to a surrounding casing (corresponding to that shown in FIG. 2 and referenced 1) and the output shaft attached to the casing correspondingly rotates, as has already been described with reference to the earlier-described embodiment.

As the phase angle between the rollers 66 and the shaft 60 increases, the resistance to rotation of the rollers about their individual axes increases with the increasing drag induced by the oil in the pockets. The torque applied to the rotate the casing therefore increases also. This produces a reduction in the speed of the flank surfaces of the helical teeth of the rollers 65,66 entering the pockets from opposite sides, respectively, so that the hydraulic pressure in the pockets diminishes. The flank surfaces of the teeth therefore move closer to one another and eventually touch. As soon as they touch, the rubbing friction between the teeth flank surfaces causes the coupling to engage fully, so that relative rotation between the rollers 65 and 66 ceases and all of the input torque is applied to the output shaft.

The advantage of the configuration of parts shown in FIGS. 10 and 11 is that a very compact assembly is achieved with the input torque during start-up being shared between a large number of meshing rollers.

I claim:

1. A coupling comprising:
    a casing defining a chamber filled with hydraulic liquid,
    at least first and second axially parallel rollers inside said chamber, at least one helical tooth formed on said first roller and at least one helical tooth formed on said second roller, said helical teeth being of the same hand and meshing with one another in a meshing zone extending between said rollers, and the radius of the helical tooth of the first roller being in a predetermined ratio to the radius of the helical tooth of the second roller, and said teeth having flank surface means for preventing efficient transmission of drive between said rollers, said flank surface means comprising flank surfaces so shaped and positioned as to be incapable of efficient transmission of drive between the rollers,
    an input drive member having an axis of rotation and connected to revolve the first and second rollers each in the same direction at a speed ratio that is the reciprocal of said predetermined ratio to translate their teeth along the meshing zone in the same direction and at the same speed,
    bearing means mounting said rollers in said casing so that at least one of said rollers is arranged eccentrically with respect to the axis of said input drive member and is held against rotation relative to the casing about said axis, whereby friction between the teeth of said rollers produces a rotational torque on said casing when said input drive member is rotated,
    output drive means coupled to the casing for deriving an output from rotation of said casing,
    adjustable means operable to alter the phase of rotation of the first roller with respect to the input drive member, and
    resiliently yieldable biasing means enabling the second roller to yield stiffly in an angular direction in response to force applied to it by a change of phase of rotation of the first roller,
    whereby engagement of the coupling occurs in a first stage in which the flank surfaces of the teeth are held apart by pockets of hydraulic liquid under pressure created in the pockets by relatively oppositely directed movements of the flank surfaces traveling across the meshing zone and a second stage in which reduction on relative speeds of the flank surfaces due to action of the resiliently yieldable means collapses the pressure in the pockets and enables the flank surfaces to rub on one another with progressively increasing friction to complete engagement of the coupling when relative movement between the rollers ceases.

2. A coupling according to claim 1, comprising a set of first rollers and a set of second rollers, the first and second rollers being arranged alternately in a ring around the axis of rotation of the input drive member, and wherein each roller of the set of first rollers meshes with two angularly adjacent rollers of the set of second rollers.

3. A coupling according to claim 2, in which the input drive member is a shaft that extends through the casing.

4. A coupling according to claim 1, in which the resiliently yieldable biasing means comprises a torque cell having two coaxially arranged rotary members interconnected by a ring of stiffly resilient pins.

5. A coupling according to claim 1, wherein the adjustable means are responsive to the speed of rotation of the input drive member and comprise at least one centrifugally operated and resiliently biased cam member that rotates in a constant phase relationship with the first roller, and a follower that engages the cam member and is coupled to the second roller.

6. A coupling according to claim 1, wherein the casing is cylindrical and has first and second opposite ends spaced apart along an axis of the casing, the input drive member is an input shaft that coaxially enters the casing at the first end thereof, and the out drive means comprises an output shaft having an axis of rotation, the output shaft being fixed to the casing at the second end thereof and being coaxial with the input shaft.

7. A coupling according to claim 1, wherein the rollers have multi-start threads.

8. A coupling according to claim 1, wherein the first and second rollers each have two axially spaced roller sections and a tooth of one hand on one section and a tooth of the opposite hand on the other section.

* * * * *